United States Patent [19]

Boocock

[11] Patent Number: 4,872,880

[45] Date of Patent: Oct. 10, 1989

[54] PROCESS FOR THE DYEING OF POLYMERS OF PROPYLENE, BUTENE-1 AND 4-METHYL-PENTENE-1 USING BASIC DYE IN AN AQUEOUS DYE BATH

[75] Inventor: John R. B. Boocock, Kingston, Canada

[73] Assignee: DuPont Canada Inc., Mississauga, Canada

[21] Appl. No.: 253,632

[22] Filed: Oct. 6, 1988

Related U.S. Application Data

[63] Continuation-in-part of Ser. No. 126,796, Dec. 1, 1987, abandoned.

[30] Foreign Application Priority Data

Dec. 1, 1986 [GB] United Kingdom ............. 8628658

[51] Int. Cl.$^4$ .................. C08L 23/02; D06P 1/41; D06P 3/79
[52] U.S. Cl. .................................. 8/513; 8/506; 8/654; 8/657; 8/928
[58] Field of Search ...................... 8/513, 657, 654

[56] References Cited

U.S. PATENT DOCUMENTS

| | | | |
|---|---|---|---|
| 3,256,364 | 6/1966 | Bryant et al. ................ | 8/552 |
| 3,264,272 | 8/1966 | Rees ............................. | 428/36.9 |
| 3,388,190 | 6/1968 | Bryant et al. ................ | 525/218 |
| 4,320,046 | 3/1982 | Havens ......................... | 524/83 |
| 4,612,155 | 9/1986 | Wong et al. .................. | 264/176 R |
| 4,732,571 | 3/1988 | Boocock et al. ............. | 8/513 |
| 4,737,547 | 4/1988 | White ........................... | 525/193 |

FOREIGN PATENT DOCUMENTS 0172650 2/1986 European Pat. Off. .
0207205 1/1987 European Pat. Off. .
941667 11/1963 United Kingdom .

Primary Examiner—A. Lionel Clingman
Attorney, Agent, or Firm—Frank C. Hilberg, Jr.

[57] ABSTRACT

A process for the dyeing of polymers of propylene, butene-1 and 4-methyl-pentent-1 is disclosed. The process involves contacting articles of the polymer with an aqueous dyebath containing a basic dye in a concentration of at least 0.4 g/l and at a pH of at least 5.0. The temperature of the aqueous dyebath is at least 90° C. The article is maintained in contact with the dyebath for at least 10 minutes. The polymer of propylene is preferably a blend of 50–99 parts of a homopolymer of propylene or copolymer of propylene and ethylene with 1–50 parts of a zinc ionomer or graft copolymer of a hydrocarbon alpha-olefin with an alpha-olefin having carboxylic acid or carboxylic acid anhydride. Dyed polymers are obtained.

7 Claims, No Drawings

PROCESS FOR THE DYEING OF POLYMERS OF PROPYLENE, BUTENE-1 AND 4-METHYL-PENTENE-1 USING BASIC DYE IN AN AQUEOUS DYE BATH

CROSS-REFERENCE TO RELATED APPLICATION

This application is a continuation-in-part of U.S. patent application Ser. No. 07/126,796, which was filed on 1987 Dec. 01, now abandoned.

BACKGROUND OF THE INVENTION

1. Field of the Invention

The present invention relates to a process for the dyeing of polymers of propylene, butene-1 and 4-methyl-pentene-1 and especially to the dyeing of blends of such polymers with polymers containing carboxylic acid and certain other polar groups.

2. Description of the Prior Art

Polymers of alpha-olefins in which the alpha-olefin is a hydrocarbon are well known. Such polymers, which include homopolymers of propylene and copolymers of propylene with ethylene, are used in large volumes for a variety of end-uses e.g. in the form of fibres, films, moulded articles and the like. If fabricated articles are desired in a colour other than the natural colour of the polymer, it is often possible to pigment the polymer or, especially if the surface of the polymer has been suitably treated, to print the fabricated article. The use of pigments and/or printing techniques depends to some extent on the nature of the fabricated article and the process used in the manufacture of the article.

In some instances, it is desirable or even necessary to be able to dye the fabricated article. In general, hydrocarbon polyolefins are not receptive to dyes, although techniques to render polyolefins receptive to dyes are known, including copolymerization of polar monomers into the polymer. For some end-uses, the techniques used to render polyolefins receptive to dyes may not be economically attractive and/or may affect deleteriously the properties of the polymer.

The blending of polar polymers with hydrocarbon polyolefins is known. For instance, a process for the dyeing of blends of polymers of ethylene with polymers containing carboxylic acid and certain other groups, including ionomers, is disclosed in published European patent application No. 0 207 205 of J. R. B. Boocock and V. G. Zboril, published 1987 Jan. 07. Ionomeric polymers are disclosed in U.S. Pat. No. 3 264 272 of R. W. Rees, which issued 1966 Aug. 02. The dyeing of ethylene polymers blended with copolymers of $C_{14}$ or higher alpha-olefins and maleic anhydride is described in U.S. Pat. No. 4,320,046 of R. H. Havens, which issued 1982 Mar. 16. The dyeing of acrylic polymers with basic dyes is known and is, for instance, described in a manual from Sandoz Ltd. of Basle, Switzerland, entitled "Sandocryl B Dyestuffs and Chemicals for the Dyeing and Finishing of Acrylic Fibres". Normally, dyeing is carried out at pH 4.5.

SUMMARY OF THE INVENTION

A process for the dyeing of blends of polymers of propylene, butene-1 and 4-methyl-pentene-1 with polymers having carboxylic acid and certain other polar groups has now been found.

Accordingly, the present invention provides a process for dyeing a polyolefin article, comprising the steps of:

(A) contacting the polyolefin article with an aqueous dyebath, said polyolefin being a blend comprising (i) 50-99 parts by weight of at least one polymer selected from the group consisting of homopolymers of propylene, butene-1 or 4-methyl-pentene-1 and copolymers of propylene, butene-1 or 4-methyl-pentene-1 with a minor amount of a hydrocarbon alpha-olefin, and mixtures thereof, and (ii) 1-50 parts by weight of a copolymer selected from the group consisting of direct copolymers or graft copolymers wherein (a) said direct copolymer is a zinc ionomer of a copolymer of an alpha-olefin having the formula $R-CH=CH_2$, where R is a radical selected from the class consisting of hydrogen and alkyl radicals having from 1 to 8 carbon atoms, with at least one alpha-beta-ethylenically unsaturated carboxylic acid having from 3 to 8 carbon atoms, the acid moieties being randomly or non-randomly distributed in the polymer chain, the carboxylic acid content being 0.5-50% by weight of the direct copolymer, any other copolymerized monomer being monoethylenically unsaturated, and (b) said graft copolymer is obtained by grafting 0.1 to 20 percent by weight of at least one alpha,beta-unsaturated carboxylic acid having 3 to 8 carbon atoms or unsaturated carboxylic acid anhydride onto a preformed polyolefin backbone derived from at least one of homopolymers of $C_2$ to $C_8$ hydrocarbon aplha-olefins and copolymers of ethylene and at least one $C_3$ to $C_8$ hydrocarbon alpha-olefin, in which polyolefin backbone any other optionally copolymerized monomer component is monoethylenically unsaturated, said aqueous dyebath containing basic dye in a concentration of at least 0.4 g/l and at a pH of at least 5.0, the temperature of the aqueous dyebath being at least 90° C.

(B) maintaining said polyolefin article in contact with the aqueous dyebath for a period of at least 10 minutes, and (C) removing the polyolefin article so dyed from the aqueous dyebath.

In a preferred embodiment of the present invention, the blend also contains 0.2-2% by weight of a white pigment, especially titanium dioxide.

The polymer of the blend may be at least one of homopolymers of propylene, butene-1 and 4-methyl-pentene-1 and copolymers of propylene, butene-1 and 4-methyl-pentene-1 with a minor amount e.g. up to about 25% by weight, of a hydrocarbon alpha-olefin, especially a $C_2$–$C_8$ alpha-olefin, preferably ethylene. Homopolymers and copolymers of propylene are the preferred polymers of the blend.

The characteristics of the polymer will depend to a large extent on the intended end-use of the resultant products. The ranges of density and melt index (or melt flow index), and of related parameters, of the polymers described above that are useful for various types of products are known to those skilled in the art. The present invention will generally be described hereinafter with reference to polypropylene as the polymer.

The blend also contains a copolymer which may be a direct copolymer is in the form of a zinc ionomer of a copolymer of an alpha-olefin having the formula $R-CH=CH_2$, where R is a radical selected from the group consisting of hydrogen and alkyl radicals having from 1 to 8 carbon atoms, with at least one alpha-beta ethylenically unsaturated carboxylic acid having from 3 to 8 carbon atoms. The acid moieties may be randomly or non-randomly distributed in the polymer chain The carboxylic acid content of the copolymer is 0.5-50% by weight of the copolymer. Such ionomers are known and are, for instance, available under the trade mark Surlyn from E.I. du Pont de Nemours and Company and described in detail in the aforementioned patent of R. W. Rees. For instance, it is known to form ionomers of the direct copolymers using salts of sodium, potassium and zinc by only the last is within the scope of the present invention. The dyeability of blends of polypropylene and ionomer may be dependent to a significant extent on the metal ion in the ionomer, it having been found that ionomers containing zinc tend to be significantly more readily dyeable according to the process of the present invention than ionomers containing the alkali metal sodium.

Alternatively, the copolymer may be graft copolymer obtained by grafting 0.1 to 20 percent by weight of at least one alpha,beta-unsaturated carboxylic acid having 3 to 8 carbon atoms or unsaturated carboxylic acid anhydride onto a preformed polyolefin backbone derived from at least one of homopolymers of $C_2$ to $C_8$ hydrocarbon alpha-olefins, and copolymers of ethylene and at least one $C_3$ to $C_8$ hydrocarbon alpha-olefin. Any other optionally copolymerized monomer component of the polyolefin backbone is monoethylenically unsaturated. For example, the graft copolymer may be a homopolymer of ethylene or propylene or a copolymer of ethylene with a $C_3$-$C_{10}$ hydrocarbon alpha-olefin, including copolymers of propylene and minor amounts of ethylene, that has been grafted with e.g. acrylic acid, methacrylic acid, maleic acid, fumaric acid, itaconic acid, crotonic acid and maleic anhydride, optionally in the presence of styrene. Techniques for the preparation of grafted copolymers are known in the art, preferred examples of which are disclosed in published European patent application No. 0 172 650 of G. White, published 1986 Feb. 26, and in U.S. Pat. No. 4,612,155 of C. S. Wong and R. A. Zelonka, which issued 1986 Sept. 16. Grafted copolymer compositions are also available from Mitsui Petrochemical Industries under the trade mark Admer. Alternatively, the graft copolymer may be obtained by grafting such carboxylic acids or carboxylic acid anhydrides onto other hydrocarbon polymers or onto copolymers of ethylene and derivatives of certain carboxylic acids. Examples of the latter graft copolymers are disclosed in published European patent application No. 0 266 994 of P. C. Wong, published 1988 May 11.

The blend comprises 50-99 parts by weight of the polypropylene and 1-50 parts by weight of the copolymer. In a preferred embodiment, the blend comprises 80-97 parts by weight of the polypropylene and 3-20 parts by weight of the copolymer.

The choice of the copolymer would depend on the properties desired in the resultant product. If it is desired for the dyeable polymer to have melt flow and the physical properties that are identical to or similar to the non-dyeable polymer, it will normally be advantageous to use a copolymer made from the same type of polymer as the non-dyeable polymer. For example, to make polypropylene dyeable, the dyeable component should be grafted polypropylene. However, where some change in properties can be tolerated it may be beneficial and commercially acceptable to employ another type of dyeable component. For example polypropylene might be made dyeable at reduced cost by blending with a zinc ionomer of a direct copolymer of ethylene and methacrylic acid.

In the process of the present invention, a polyolefin article is contacted with an aqueous dyebath. The polyolefin is as defined above. The article may be in any convenient shape or form and be obtained by extrusion, moulding or the like. In preferred embodiments, the article is in the form of fibre, film or a moulded article, techniques for the manufacture of which are known.

The dyebath is an aqueous dyebath which contains a basic dye. Although it is believed that any basic dye generally may be used in the process of the present invention, it is to be understood that major differences exist between basic dyes in the ability of the dye to dye the polymers defined herein. For instance, the hue and relative depth of dyeing obtained may differ significantly from the hue and relative depth of dyeing obtained with the same dye in the dyeing of, for instance, acrylic polymers. Such differences may be advantageous, depending on the result that is being sought. The hue and relative depth may also differ with the dyeing conditions used e.g. concentrations, pH and temperature. Examples of suitable dyes are illustrated.

It is known that a few basic dyes will dye polypropylene in the absence of copolymer as described herein. It is believed that the presence of copolymer improves the dyeability of polypropylene with such dyes, including dye retention and other properties.

The concentration of dye in the dyebath is at least 0.4 g/l and especially 2-5 g/l. However, the concentration that should be used will depend on the extent of dyeing of the article, the nature of the polymer blend and the particular dye selected. Such factors are illustrated hereinafter in the examples. The pH of the dyebath is at least 5.0, especially 5.5-7.0, but the preferred pH may depend on the particular dye selected; the pH of the dyebath should be below the pH at which any precipitation and/or degradation of the basic dye may occur. As used herein, pH is measured at the temperature of the dyebath. The temperature of the dyebath should be at least 90° C.; the temperature must be kept below the temperature at which distortion or other deleterious physical property changes can occur in the polyolefin blend, as will be understood by those skilled in the art. The preferred temperature range is from 90° C. up to the temperature at which such distortion or other change may occur and/or the temperature at which property changes in the dye may occur. The dye must be selected so that it has adequate stability under the dyeing conditions. It is understood that the dyebath is agitated. It is preferred that the dyebath does not contain so-called levellers or retarders, or a minimal amount thereof, which is contrary to practice in the dyeing of acrylic fibres. In the dyeing of polypropylene, levellers should be used only under the most favourable circumstances.

In the process, the polyolefin article is maintained in the dyebath for at least 10 minutes, and preferably at least 30 minutes. The period of time will depend, however, on the particular dye selected, the nature of the polyolefin and the depth of the dyeing that is to be achieved. The polyolefin article is then removed from the bath and washed or cleaned as appropriate.

In a preferred embodiment a white pigment, especially titanium dioxide, is incorporated into the polyolefin; the white pigment tends to reduce apparent dye depth but may result in a more acceptable appearance.

The white pigment is preferably used in amount of 0.2–2% by weight.

The process of the present invention may be used in the dyeing of polyolefin film. In that event, it may be preferred that the dyed film be coloured but transparent. It may be preferred to only tint the film, rather than dye the film to an intense colour.

The present invention is illustrated by the following examples.

EXAMPLE I

Blends of polypropylene with 5%, by weight, of ionomer and 1%, by weight, of titanium dioxide (67% by weight) in polyethylene were prepared and then extruded through a 1.91 cm Brabender ™ single screw extruder equipped with a 0.12 cm die to form filaments having a diameter of about 0.7 mm. Such filaments were in a substantially undrawn state. Some of the filaments were, however, cold drawn to provide drawn filaments having a diameter of about 0.3 mm.

Skeins of undrawn and of drawn filaments were dyed in an aqueous dyebath for one hour at a temperature of 95°–100° C. The dye concentration was 3.6 g/liter and the dyebath had a pH of 5.5. In separate experiments the dyes were Sandocryl ™ Brilliant Yellow B-6GL (200%) and Sandocryl Brilliant Blue B-BLE.

In separate runs, the polypropylene was a homopolymer of propylene, coded TM3600(94), and a copolymer of propylene containing about 5% by weight of ethylene, coded ST6100(94), both obtained from Shell Canada Limited. The ionomer was a copolymer of ethylene with 15% methacrylic acid, 23% neutralized with zinc, with a melt index of 5.5 dg/min.

The dye depth of all undrawn samples was rated as good on visual examination but the dye depth of the drawn samples was rated as only fair.

This example illustrates the dyeing of polypropylene using basic dyes.

EXAMPLE II

Using the procedure of Example I, except that the pH of the dyebath was 6.5, the following samples of polymers were prepared and subjected to the dyeing process.

A. a copolymer of propylene and a minor amount of ethylene, obtained from Shell Canada Limited under the designation JY 6100;

B. the copolymer of A after heating for 5 minutes at 172° C. in a Brabender Plasticorder ™ extrusion device;

C. a blend of 80% by weight of the copolymer of A with 20% by weight of an ethylene/methacrylic acid ionomer containing 15% by weight of the comonomer, 59% neutralized with sodium, and having a melt index of 0.9 dg/min; and D. a blend of 80% by weight of the copolymer of A with 20% by weight of an ethylene/methacrylic acid ionomer containing 12% by weight of the comonomer, 47% neutralized with zinc ions, and having a melt index of 1.0 dg/min.

In separate runs, the dyes used in the dyebath were as follows:
1. Sandocryl Brilliant Yellow B6GL 200%
2. Sandocryl Brilliant Red BF 200%
3. Sandocryl Red B-RLN 200%
4. Sandocryl Brilliant Blue B-BLE The results obtained, using visual inspection of the samples and a scale of 0 (no colour in the sample after the dyeing process) to 10 (dyed to a very deep colour), were as follows:

| Polymer | A | B | C | D |
|---|---|---|---|---|
| DYE | | | | |
| 1 | 0 | 0 | ** | 6 |
| 2 | 5 | 5 | 6 | 7 |
| 3 | 2 | 2 | 4 | 4 |
| 4 | 1*** | 1*** | **** | 8 |

**a "pinkish" shade
***dyed to a green color
****dyed to a very deep black/blue color In this example, the runs using polymers A, B and C are comparative runs; the other runs i.e. using polymer D, illustrate the dyeing of polypropylene using the process of the present invention.

EXAMPLE III

The procedure of Example II was repeated using films pressed from following polymers, and Dyes 1 and 4 of Example II:

E. homopolymer of propylene obtained from Himont Canada Inc. as Profax ™ PD 888;

F. poly-4-methyl-pentene-1 homopolymer obtained from Mitsui Petrochemical Industries Ltd. under the trade name TPX RT18;

G. a propylene homopolymer solution grafted with 4% by weight of maleic anhydride; and H. polymer F grafted with 0.4% maleic anhydride.

The results obtained, using the scale of Example II, on dyed samples that had been washed in glacial acetic acid were as follows:

| Run | First | Second | Dye Level | |
|---|---|---|---|---|
| No. | Polymer (%) | Polymer (%) | Dye 1 | Dye 4 |
| 1 | E (97) | G (3) | 4 | 6 |
| 2 | E (90) | G (10) | 5 | 8 |
| 3 | E (100) | — | 3 | 2** |
| 4 | F (100) | — | 1 | 0 |
| 5 | F (80.5) | H (19.5) | 4 | 2 |

**the dyed sample had a green tinge

In this example, Runs 3 and 4 are comparative runs, whereas Runs 1, 2 and 5 illustrate the process of the present invention.

EXAMPLE IV

In a series of runs, Profax PD 888 homopolymer propylene was blended with the other polymers using a Brabender Plasticorder extrusion device; details of the polymers and the compositions used are given below. Films were pressed from the resultant blends and then dyed in dye baths containing 3.5 g/l of dye at a pH of 6.5 for periods of one hour at a temperature of 95°–100° C. The samples were then washed with a solution of 50% aqueous acetic acid and allowed to dry. The colours of the dyed samples thus obtained were rated using the same scale as used in Example II.

The dyes used in the dyeing of the samples were Dyes 1 and 4 of Example II. The polymers used were as follows:

I. Shell 7701 polypropylene copolymer that had been grafted with 0.3% by weight of maleic anhydride;

J. Shell 6401 polypropylene homopolymer grafted with 1% by weight of each of maleic anhydride and styrene; and K. Shell 6801 polypropylene homopolymer grafted with 4% by weight of maleic anhydride.

Further details and the results obtained were as follows:

| Run No. | Polymer (%) | Dye Level Dye 1 | Dye 4 |
|---|---|---|---|
| 6 | I (10) | 7 | 7 |
| 7 | I (25) | 7 | 8 |
| 8 | J (10) | 7 | 7 |
| 9 | J (25) | 7 | 8 |
| 10 | K (3) | 7 | 7 |
| 11 | K (10) | 7 | 8 |
| 12 | * | 4 | 3 |

*This sample was prepared using 100% of Profax PD 888 i.e. no other polymer was added. Runs 6-11 illustrate the process of the present invention, whereas Run 12 is a comparative run.

EXAMPLE V

Using the procedure of Example IV, samples of Runs 6 and 12 were dyed at temperatures of 26° C., 45° C. and 95°-100° C. The results obtained were as follows:

| Run No. | Polymer (%) | Temperature | Dye Level Dye 1 | Dye 4 |
|---|---|---|---|---|
| 13 | I (10) | 26 | — | 0 |
| 14 | I (10) | 45 | 1 | 1 |
| 15 | I (10) | 95-100 | 7 | 7 |
| 16 | — | 26 | — | 0 |
| 17 | — | 45 | 0 | 1 |
| 18 | — | 95-100 | 4 | 3* |

*greenish tinge

This example illustrates the effect of dyebath temperature. Run 15 illustrates the present invention, whereas the remaining runs are comparative runs, because of bath temperature and/or polymer composition.

EXAMPLE VI

In order to conduct runs to compare the dyeing of a polyethylene according to the process of U.S. 4,732,571 of J. R. B. Boocock and V. G. Zboril, issued 1988 Mar. 22, with the dyeing of polypropylene according to the present invention, the following compositions were prepared on a Brabender Plasticorder:

Sample L ... 4.6 parts by weight of an ethylene/butene-1 copolymer having a density of 0.920 g/cm³ and melt index of 0.94 dg/min that had been grafted with 0.7% by weight of maleic anhydride and 27.4 parts by weight of an ethylene/butene-1 copolymer having a density of 0.920 g/cm³ and a melt index of 1.4 dg/min.

Sample M ... 9.4 parts by weight of a homopolymer of propylene having a melt flow index of 300 dg/min that had been grafted with 0.34% by weight of maleic anhydride and 22.6 parts by weight of a homopolymer of propylene having a melt flow index of 1.0 dg/min.

The samples have a similar content of graft monomer and the graft polymer has a similar backbone to that of the un-grafted polymer so as to improve compatibility between the polymers.

Each of Sample L and Sample M were pressed into films and dyed under the following conditions:
Dye bath temperature 95°-100° C.;
Dye bath pH 6.5;
Dye concentration 3.6 g/l
The dyes used were:

Dye X Sandrocryl Brilliant Yellow B6GL
Dye Y Sandrocryl Brilliant Blue B-BLE

The results obtained were as follows, using a scale of 0 (no dyeing) to 10 (deeply dyed):

| Run No. | Sample | Dye Depth at Dyeing Time of (in minutes) | | | | | |
|---|---|---|---|---|---|---|---|
| | | 0 | 0.3 | 1 | 3 | 10 | 30 | 60 |
| 19 A | L | 0 | 3 | 3 | 4 | 5 | 5 | 7 |
| 19 B | L | 0 | 2 | 2 | 3 | 3 | 4 | 5 |
| 20 A | M | 0 | 2 | 4 | 8 | 9 | 10* | 10* |
| 20 B | M | 0 | T | T | T | 1 | 3 | 5 |

Note:
Run 19 used the yellow dye and Run 20 used the blue dye.
T = tint only, * = dyed almost black
There was a difference in the shades of blue between Run 20 A and Run 20 B This example illustrates that polypropylene is not as readily dyed as polyethylene using basic dyes according to the method of the present invention.

I claim:

1. A process for dyeing a polyolefin article, comprising the steps of:
   (A) contacting the polyolefin article with an aqueous dyebath, said polyolefin being a blend comprising (i) 50-99 parts by weight of at least one polymer selected from the group consisting of homopolymers of propylene, butene-1 or 4-methyl-pentene-1 and copolymers of propylene, butene-1 or 4-methyl-pentene-1 with a minor amount of a hydrocarbon alpha-olefin, and mixtures thereof, and (ii) 1-50 parts by weight of a copolymer selected from the group consisting of direct copolymers or graft copolymers wherein (a) said direct copolymer is a zinc ionomer of a copolymer of an alpha-olefin having the formula R—CH=CH$_2$, where R is a radical selected from the class consisting of hydrogen and alkyl radicals having from 1 to 8 carbon atoms, with at least one alpha-beta-ethylenically unsaturated carboxylic acid having from 3 to 8 carbon atoms, the acid moieties being randomly or non-randomly distributed in the polymer chain, the carboxylic acid content being 0.5-50% by weight of the direct copolymer, any other copolymerized monomer being monoethylenically unsaturated, and (b) said graft copolymer is obtained by grafting 0.1 to 20 percent by weight of at least one alpha,-beta-unsaturated carboxylic acid having 3 to 8 carbon atoms or unsaturated carboxylic acid anhydride onto a preformed polyolefin backbone derived from at least one of homopolymers of C$_2$ to C$_8$ hydrocarbon alpha-olefins, copolymers of ethylene and at least one C$_3$ to C$_8$ hydrocarbon alpha-olefin and copolymers of ethylene and unsaturated carboxylic acids, in which polyolefin backbone any other optionally copolymerized monomer component is monoethylenically unsaturated, said aqueous dyebath containing basic dye in a concentration of at least 0.4 g/l and at a pH of at least 5.0, the temperature of the aqueous dyebath being at least 90° C.,
   (B) maintaining said polyolefin article in contact with the aqueous dyebath for a period of at least 10 minutes, and
   (C) removing the polyolefin article so dyed from the aqueous dyebath.

2. The process of claim 1 in which the pH of the dyebath is in the range of 5.5-7.0.

3. The process of claim 2 in which the blend contains 0.2–2.0% of a white pigment.

4. The process of claim 3 in which the white pigment is titanium dioxide.

5. The process of claim 1 in which the concentration of the dyestuff is 2–5 g/1.

6. The process of claim 1 in which the copolymer is an ionomer of (a).

7. The process of claim 1 in which the copolymer is a graft copolymer of (b).

* * * * *